United States Patent [19]
Jeppesen

[11] Patent Number: 6,000,459
[45] Date of Patent: Dec. 14, 1999

[54] U-BEND PIPE SPACER

[76] Inventor: Kris Jeppesen, 1000 N. 32nd Ave., Brookings, S. Dak. 57006

[21] Appl. No.: 09/312,735

[22] Filed: May 14, 1999

[51] Int. Cl.⁶ ........................................................ F28D 7/00
[52] U.S. Cl. ................................. 165/45; 165/76; 62/260; 248/58; 248/62
[58] Field of Search ................. 165/45, 46, 69, 165/162, 76; 62/260; 248/58, 59, 60, 62

[56] References Cited

U.S. PATENT DOCUMENTS

| | | | |
|---|---|---|---|
| 447,297 | 3/1891 | Carpenter | 248/58 |
| 4,160,477 | 7/1979 | Roffler | 165/162 X |
| 4,715,429 | 12/1987 | Morgensen | 165/45 |
| 4,867,229 | 9/1989 | Morgensen | 165/45 X |
| 5,054,541 | 10/1991 | Tripp | 165/45 |
| 5,590,715 | 1/1997 | Amerman | 165/45 X |

FOREIGN PATENT DOCUMENTS

| | | | |
|---|---|---|---|
| 3149636 | 7/1983 | Germany | 165/45 |

*Primary Examiner*—Christopher Atkinson
*Attorney, Agent, or Firm*—Kaardal & Associates, PC

[57] ABSTRACT

A U-bend pipe spacer for separating vertical portions of a U-bend pipe in a bore in the ground during installation of the U-bend pipe in a geothermal vertical heat exchanger system. The U-bend pipe spacer includes a biasing member with a pair of elongate portions having free ends biased apart from one another. The elongate portions of the biasing member is resiliently deflectable from a relaxed position to a deflected portion such that the free ends of the elongate portions of the biasing member are positioned closer to each other when the elongate portions are in the deflected position. The spacer also includes a pair of clip members each comprising a body having a concave arcuate side face defining a channel and a tremie hook is coupled to the body. The tremie hook has a concave side. The body of a first of the clip members is coupled to the free end of a first of the elongate portions of the biasing member and the body of a second of the clip members is coupled to the free end of a second of the elongate portions of the biasing member with the channels of the clip members facing outwardly away from each other. The channel of the body of the first clip member is designed for receiving a first elongate portion of a U-bend pipe therein and the channel of the body of the second clip member is designed for receiving a second elongate portion of the U-bend pipe therein. The bodies of the clip members are positioned adjacent each other when the elongate portions of the biasing member are positioned in the deflected position. In this deflected position, the tremie hooks of the clip members overlap each other so that the concave sides of the tremie hooks face one another and define a tremie space therebetween for extending a tremie pipe therethrough which holds the elongate portions of the biasing member in the deflected position as long as the tremie pipe is in the tremie space.

5 Claims, 4 Drawing Sheets

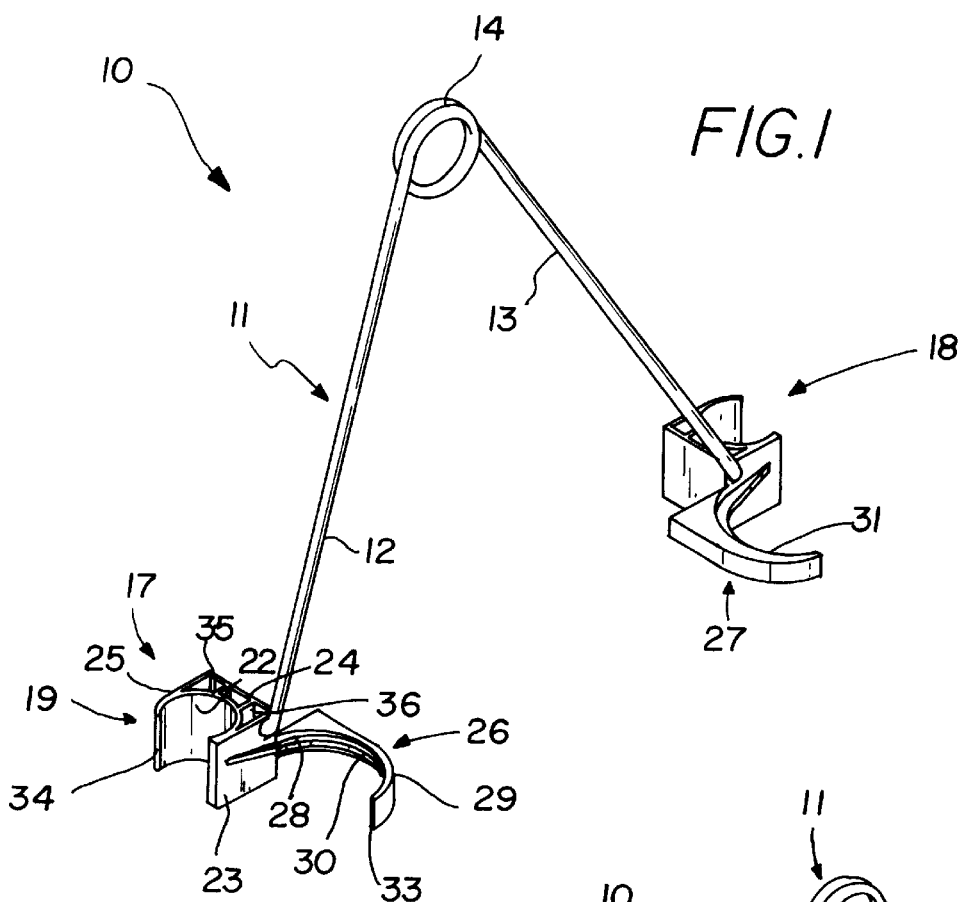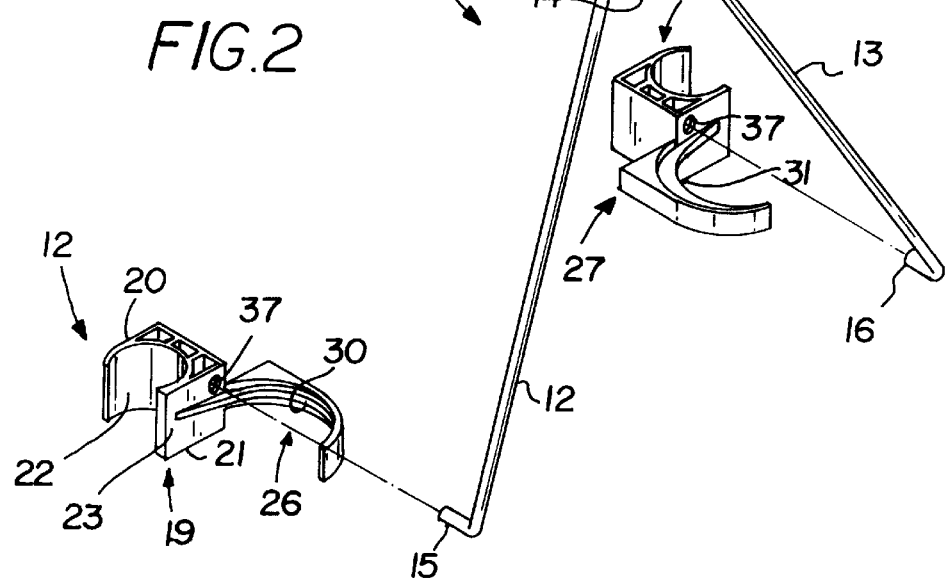

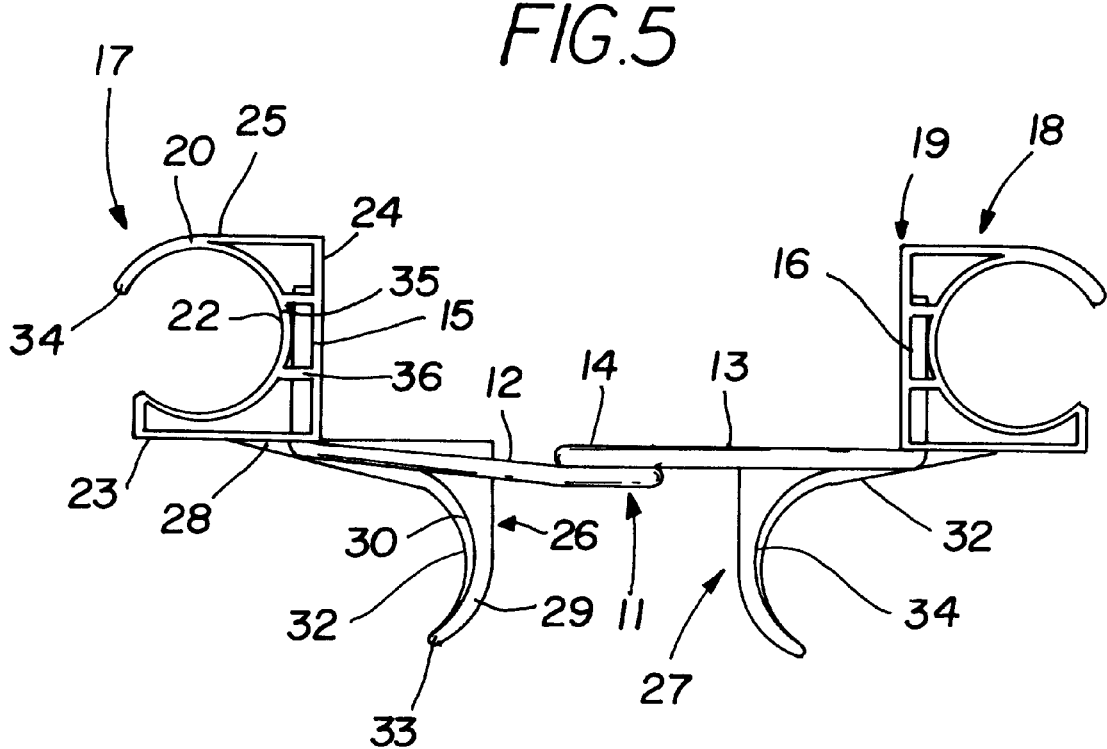
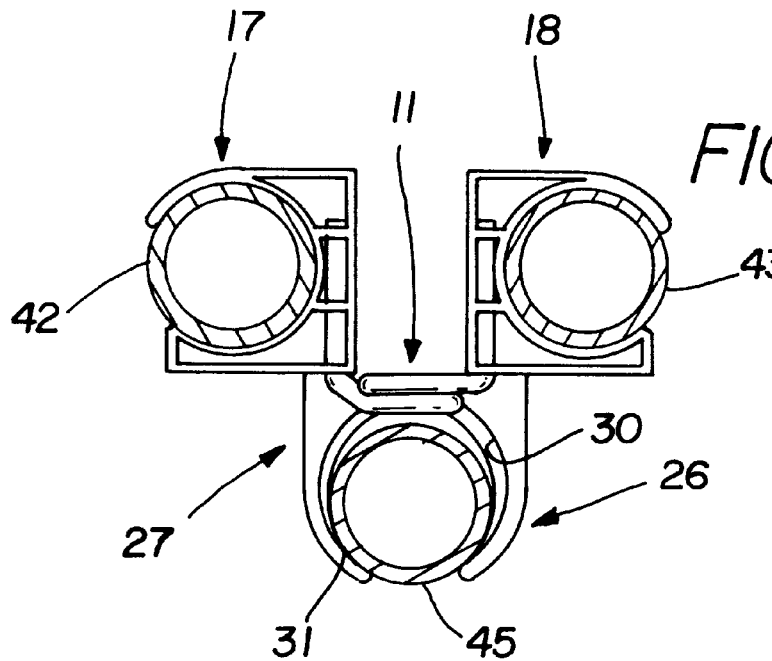

U-BEND PIPE SPACER

BACKGROUND OF THE INVENTION

1. Field of the Invention

The present invention relates to geothermal vertical heat exchanger systems and more particularly pertains to a new U-bend pipe spacer for separating vertical portions of a U-bend pipe in a bore in the ground during installation of the U-bend pipe in a geothermal vertical heat exchanger system.

2. Description of the Prior Art

The purpose of a geothermal heat exchanger is to exchange energy with the Earth by circular a water/antifreeze solution through plastic pipe that is buried below the Earth's surface. In one type of geothermal heat exchanger, the installation procedure first requires the drilling of a vertical bore into the ground. Next, a U-bend fitting is fused onto the lower ends of two polyethylene plastic pipes to form a U-bend pipe which is then inserted into the bore. A grout such as a 20% bentonite grout is pumped into the bore via a pipe (called a tremie) inserted into the bore.

The bentonite grout that is used to fill the bore acts as an insulator by impairing heat transfer between the elongate portions of the U-bend pipe and the surrounding soil. The insulating effect of the ground thereby requires longer bore lengths. Using a higher thermal conductivity grout material helps to eliminate this insulating effect. However, most States mandate grouting with bentonite to ensure that the bore is sealed tight to prevent contaminated from entering aquifers below the ground surface. Thermally enhanced bentonite grouts are becoming available but are costly and labor intensive to use.

Known prior art includes U.S. Pat. No. 4,715,429; U.S. Pat. No. 4,867,229; U.S. Pat. No. 4,867,229; U.S. Pat. No. 5,590,715; U.S. Pat. No. 4,595,059;U.S. Pat. No. 2,554,661; U.S. Pat. No. 5,372,016; U.S. Pat. No. 5,004,374; U.S. Pat. No. 388,439; U.S. Pat. No. 447,297; U.S. Pat. No. 4,160,477; and U.S. Pat. No. 5,072,786.

While these devices fulfill their respective, particular objectives and requirements, the aforementioned patents do not disclose a new U-bend pipe spacer. The inventive device includes a biasing member with a pair of elongate portions having free ends biased apart from one another. The elongate portions of the biasing member is resiliently deflectable from a relaxed position to a deflected portion such that the free ends of the elongate portions of the biasing member are positioned closer to each other when the elongate portions are in the deflected position. The spacer also includes a pair of clip members each comprising a body having a concave arcuate side face defining a channel and a tremie hook is coupled to the body. The tremie hook has a concave side. The body of a first of the clip members is coupled to the free end of a first of the elongate portions of the biasing member and the body of a second of the clip members is coupled to the free end of a second of the elongate portions of the biasing member with the channels of the clip members facing outwardly away from each other. The channel of the body of the first clip member is designed for receiving a first elongate portion of a U-bend pipe therein and the channel of the body of the second clip member is designed for receiving a second elongate portion of the U-bend pipe therein. The bodies of the clip members are positioned adjacent each other when the elongate portions of the biasing member are positioned in the deflected position. In this deflected position, the tremie hooks of the clip members overlap each other so that the concave sides of the tremie hooks face one another and define a tremie space therebetween for extending a tremie pipe therethrough which holds the elongate portions of the biasing member in the deflected position as long as the tremie pipe is in the tremie space.

In these respects, the U-bend pipe spacer according to the present invention substantially departs from the conventional concepts and designs of the prior art, and in so doing provides an apparatus primarily developed for the purpose of separating vertical portions of a U-bend pipe in a bore in the ground during installation of the U-bend pipe in a geothermal vertical heat exchanger system.

SUMMARY OF THE INVENTION

In view of the foregoing disadvantages inherent in the known types of geothermal vertical heat exchanger systems now present in the prior art, the present invention provides a new U-bend pipe spacer construction wherein the same can be utilized for separating vertical portions of a U-bend pipe in a bore in the ground during installation of the U-bend pipe in a geothermal vertical heat exchanger system.

The general purpose of the present invention, which will be described subsequently in greater detail, is to provide a new U-bend pipe spacer apparatus and method which has many of the advantages of the geothermal vertical heat exchanger systems mentioned heretofore and many novel features that result in a new U-bend pipe spacer which is not anticipated, rendered obvious, suggested, or even implied by any of the prior art geothermal vertical heat exchanger systems, either alone or in any combination thereof.

To attain this, the present invention generally comprises a biasing member with a pair of elongate portions having free ends biased apart from one another. The elongate portions of the biasing member is resiliently deflectable from a relaxed position to a deflected portion such that the free ends of the elongate portions of the biasing member are positioned closer to each other when the elongate portions are in the deflected position. The spacer also includes a pair of clip members each comprising a body having a concave arcuate side face defining a channel and a tremie hook is coupled to the body. The tremie hook has a concave side. The body of a first of the clip members is coupled to the free end of a first of the elongate portions of the biasing member and the body of a second of the clip members is coupled to the free end of a second of the elongate portions of the biasing member with the channels of the clip members facing outwardly away from each other. The channel of the body of the first clip member is designed for receiving a first elongate portion of a U-bend pipe therein and the channel of the body of the second clip member is designed for receiving a second elongate portion of the U-bend pipe therein. The bodies of the clip members are positioned adjacent each other when the elongate portions of the biasing member are positioned in the deflected position. In this deflected position, the tremie hooks of the clip members overlap each other so that the concave sides of the tremie hooks face one another and define a tremie space therebetween for extending a tremie pipe therethrough which holds the elongate portions of the biasing member in the deflected position as long as the tremie pipe is in the tremie space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new U-bend pipe spacer apparatus and method which has many of the advantages of the geothermal vertical heat exchanger systems mentioned heretofore and many novel features that result in a new U-bend pipe spacer which is not anticipated, rendered obvious, suggested, or even implied by any of the prior art geothermal vertical heat exchanger systems, either alone or in any combination thereof.

It is another object of the present invention to provide a new U-bend pipe spacer which may be easily and efficiently manufactured and marketed.

It is a further object of the present invention to provide a new U-bend pipe spacer which is of a durable and reliable construction.

An even further object of the present invention is to provide a new U-bend pipe spacer which is susceptible of a low cost of manufacture with regard to both materials and labor, and which accordingly is then susceptible of low prices of sale to the consuming public, thereby making such U-bend pipe spacer economically available to the buying public.

Still yet another object of the present invention is to provide a new U-bend pipe spacer which provides in the apparatuses and methods of the prior art some of the advantages thereof, while simultaneously overcoming some of the disadvantages normally associated therewith.

Still another object of the present invention is to provide a new U-bend pipe spacer for separating vertical portions of a U-bend pipe in a bore in the ground during installation of the U-bend pipe in a geothermal vertical heat exchanger system.

Yet another object of the present invention is to provide a new U-bend pipe spacer which includes a biasing member with a pair of elongate portions having free ends biased apart from one another. The elongate portions of the biasing member is resiliently deflectable from a relaxed position to a deflected portion such that the free ends of the elongate portions of the biasing member are positioned closer to each other when the elongate portions are in the deflected position. The spacer also includes a pair of clip members each comprising a body having a concave arcuate side face defining a channel and a tremie hook is coupled to the body. The tremie hook has a concave side. The body of a first of the clip members is coupled to the free end of a first of the elongate portions of the biasing member and the body of a second of the clip members is coupled to the free end of a second of the elongate portions of the biasing member with the channels of the clip members facing outwardly away from each other. The channel of the body of the first clip member is designed for receiving a first elongate portion of a U-bend pipe therein and the channel of the body of the second clip member is designed for receiving a second elongate portion of the U-bend pipe therein. The bodies of the clip members are positioned adjacent each other when the elongate portions of the biasing member are positioned in the deflected position. In this deflected position, the tremie hooks of the clip members overlap each other so that the concave sides of the tremie hooks face one another and define a tremie space therebetween for extending a tremie pipe therethrough which holds the elongate portions of the biasing member in the deflected position as long as the tremie pipe is in the tremie space.

Still yet another object of the present invention is to provide a new U-bend pipe spacer that positioned the two vertical elongate portions of the U-bend pipe towards the side wall of the bore in the ground to help eliminate the insulating effects of bentonite grout used to seal the bore after the U-bend pipe is installed. The bentonite grout is pumped into the bore via a tremie pipe which is also inserted into the bore and which is then pulled out as the grout fills the bore.

Even still another object of the present invention is to provide a new U-bend pipe spacer that helps keep the vertical elongate portions of the U-bend pipe apart from each other so that their impairing effect on each other's heat transfer properties.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new U-bend pipe spacer in a relaxed position according to the present invention.

FIG. 2 is a schematic exploded perspective view of the present invention.

FIG. 5 is a schematic top view of the present invention in the relaxed position.

FIG. 6 is a schematic top view of the present invention in use in the deflected position with elongate portions of a U-bend pipe and a tremie pipe attached to the U-bend pipe spacer.

DESCRIPTION OF THE PREFERRED EMBODIMENT

Figure 3:
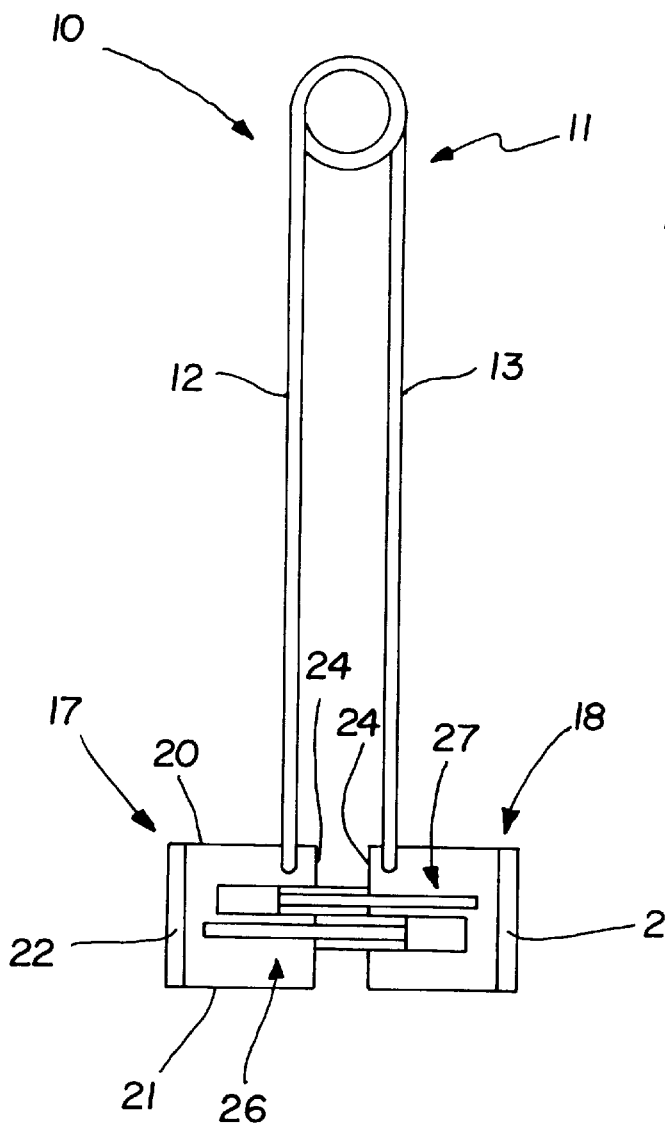
FIG. 3 is a schematic side view of the present invention in a deflected position.
Figure 4:
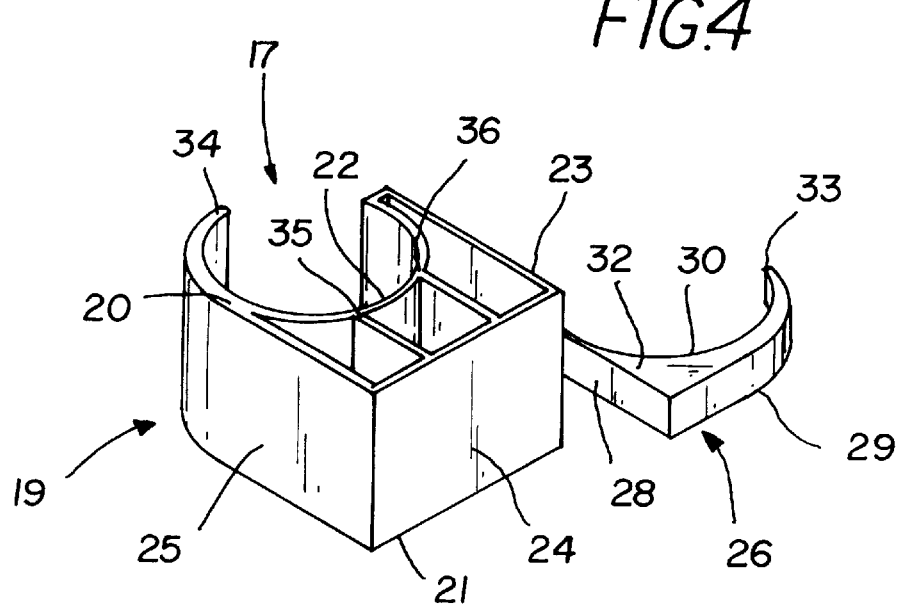
FIG. 4 is a schematic perspective view of a clip member of the present invention.

With reference now to the drawings, and in particular to FIGS. 1 through 8 thereof, a new U-bend pipe spacer embodying the principles and concepts of the present invention and generally designated by the reference numeral 10 will be described.

As best illustrated in FIGS. 1 through 6, the U-bend pipe spacer 10 generally comprises a biasing member with a pair of elongate portions having free ends biased apart from one another. The elongate portions of the biasing member is resiliently deflectable from a relaxed position to a deflected portion such that the free ends of the elongate portions of the biasing member are positioned closer to each other when the elongate portions are in the deflected position. The spacer also includes a pair of clip members each comprising a body having a concave arcuate side face defining a channel and a tremie hook is coupled to the body. The tremie hook has a concave side. The body of a first of the clip members is coupled to the free end of a first of the elongate portions of the biasing member and the body of a second of the clip members is coupled to the free end of a second of the elongate portions of the biasing member with the channels of the clip members facing outwardly away from each other. The channel of the body of the first clip member is designed for receiving a first elongate portion of a U-bend pipe therein and the channel of the body of the second clip member is designed for receiving a second elongate portion of the U-bend pipe therein. The bodies of the clip members are positioned adjacent each other when the elongate portions of the biasing member are positioned in the deflected position. In this deflected position, the tremie hooks of the clip members overlap each other so that the concave sides of the tremie hooks face one another and define a tremie space therebetween for extending a tremie pipe therethrough which holds the elongate portions of the biasing member in the deflected position as long as the tremie pipe is in the tremie space.

FIG. 1 illustrates the U-bend pipe spacer which is designed for use in conjunction with a plurality of other U-bend pipe spacers in the installation of a geothermal vertical heat exchanger system. Specifically, each U-bend pipe spacer 10 includes a biasing member 11 having a pair of elongate portions 12,13 and a coiled portion 14 integrally connecting the elongate portions of the biasing member together. The biasing member may comprise a single metal rod shaped into the portions of the biasing member. In one embodiment, the coiled portion of the biasing member may have a least one complete circular turn and permitting resilient deflection of the elongate portions of the biasing member with respect to one another.

Each of the elongate portions of the biasing member has a free end opposite the coiled portion of the biasing member. As best illustrated in FIG. 2, the free end of each elongate portion of the biasing member has an elongate end extent 15,16 outwardly extending therefrom substantially perpendicular to the respective elongate portion of the biasing member.

In an illustrative embodiment, each of the elongate portions of the biasing member may have a length of about 7 inches, the coiled portion may have a diameter of about 1 inch and the end extents each may have a length of about 1¼ inches.

In use, the coiled portion of the biasing member permits resilient deflection of the elongate portions of the biasing member towards each other from a relaxed position (see FIGS. 1 and 2) to a deflected portion (see FIG. 3) such that the free ends of the elongate portions of the biasing member are positioned closer to each other when the elongate portions are in the deflected position. The elongate portions of the biasing member may be extended at an acute angle to one another when in the elongate portions are in the relaxed position. In one such embodiment, the acute angle between the elongate portions in the relaxed position may be between about 45 degrees and about 85 degrees. In another such embodiment, the acute angle between the elongate portions in the relaxed position may be about 70 degrees.

Each the U-bend pipe spacer further comprises a pair of clip members 17,18. As illustrated in FIGS. 1, 2, 3, 4 and 5, each clip member includes a body 19 having a pair of opposite end faces 20,21, a concave arcuate side face 22 and three planar side faces 23,24,25 extending between the end faces of the body.

The arcuate side face of the body has a generally C-shaped transverse cross section and defines a channel extending between the end faces of the body.

A first 23 of the planar side faces of the body of each clip member has tremie hook 26,27 coupled thereto. Each tremie hook lies in a plane between the end faces of the body of the respective clip member.

Each tremie hook has proximal and distal portions 28,29 extending substantially perpendicular to each other. The proximal portion of the tremie hook is extended substantially parallel to the first planar side face. The proximal portion of the tremie hook is also outwardly extended in a direction away from a second 24 of the planar side faces located adjacent the first planar side face. The distal portion of the tremie hook is outwardly extended away from the first planar side face substantially perpendicular to the first planar side face.

Each tremie hook has a concave side 30,31 extending along the proximal and distal portions of the tremie hook. Optionally, the concave side of each tremie hook may have an reinforcing ridge 32 extending therealong for adding structural strength to the tremie hook. Additionally, the distal portion of each tremie hook may have an rounded tip 33 curving with the concave side of the tremie hook.

As best illustrated in FIG. 5, a third 25 of the planar side faces located adjacent the second planar side face is extended substantially parallel to the first planar side face. The third planar side face may have a curved end region 34 adjacent an edge of the arcuate side face.

The body may also have a plurality of spaced apart reinforcing ribs 35,36 extending between the arcuate side face and the second side face for providing additionally structural strength to the body.

The first planar side face of the body of a first 17 of the clip members is pivotally coupled to the end extent of the free end of a first 12 of the elongate portions of the biasing member. Similarly, the first planar side faces of the body of a second 18 of the clip members is pivotally coupled to the end extent of the free end of a second 13 of the elongate portions of the biasing member. In one such embodiment, the first planar side faces of the bodies of the clip members each have a hole 37 therein through which the end extent of the associated elongate portion of the biasing member to pivotally coupled the first sides of the bodies of the clip members to the end extents of the elongate portions of the biasing member.

As shown in FIG. 5, the clip members are attached to biasing member such that the second planar side faces of the bodies of the clip members face one another and the proximal portions of the tremie hooks of the clip members are extended towards each other. The distal portions of the tremie hooks of the clip members are extended substantially parallel to each other in an opposite direction away from the end extents of the elongate portions of the biasing member.

FIG. 6 illustrates the elongate portions of the biasing member of the U-bend pipe spacer in the deflected position. In this position, the tremie hooks of the clip members overlap each other so that the arcuate sides of the tremie hooks face one another and define a tremie space therebetween.

Figure 7:
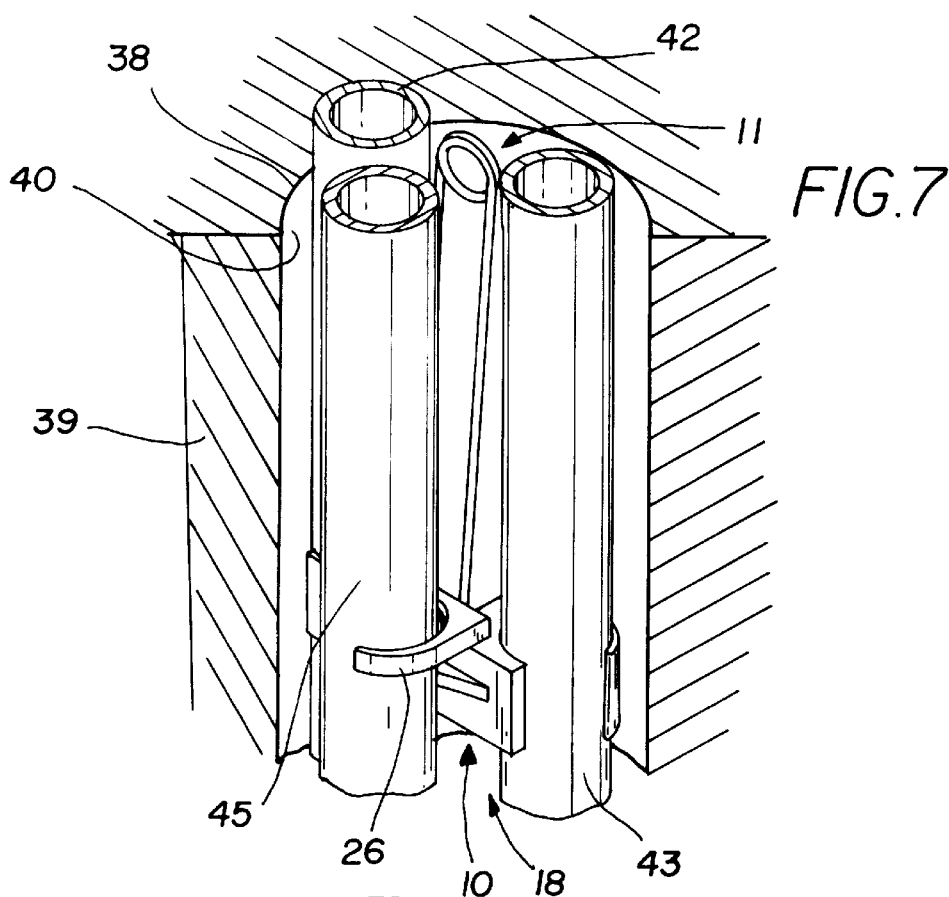
FIG. 7 is a schematic partial perspective view of the present invention in use in a bore in the ground for a geothermal vertical heat exchanger system.
Figure 8:
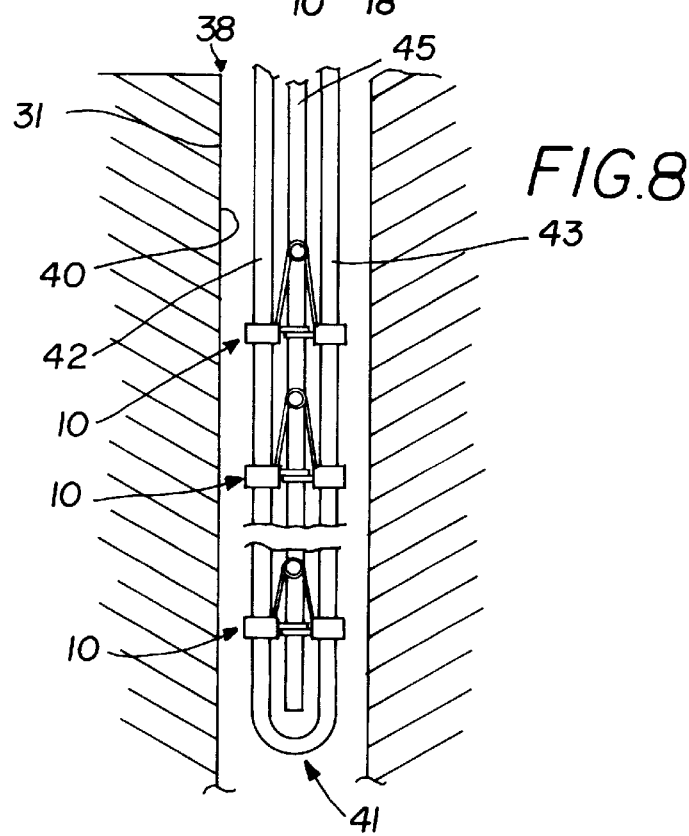
FIG. 8 is a schematic side view of the present invention in use in a bore in the ground for a geothermal vertical heat exchanger system.

FIGS. 6, 7 and 8 illustrate the U-bend pipe spacer in use with a geothermal vertical heat exchanger system which includes a an elongate vertical bore 38 downwardly extending into the ground 39. The vertical bore may have a generally circular transverse cross section such that an inner surface 40 of the bore is generally cylindrical in shape.

The geothermal vertical heat exchanger system also includes an elongate flexible U-bend pipe 41 having a pair of elongate portions 42,43 and a U-bend 44 connecting lower ends of the elongate portions of the U-bend pipe together. The U-bend pipe is designed for circulating fluid such as a water and antifreeze solution therethrough to exchange heat energy with the ground.

The geothermal vertical heat exchanger system further includes an elongate flexible tremie pipe 46 having an open lower end and an upper end in fluid communication with a fluid grout mixture (such as a bentonite grout mixture) for pouring into the bore to fill the bore with the grout.

As illustrated in FIGS. 6 and 7, the channels of the bodies of the clip members each are designed for receiving therein a corresponding elongate portion of a U-bend pipe has a pair of elongate portions. Specifically, the channel of the first clip member receives therein a first of the elongate portions of the U-bend pipe to attach the first clip to the first elongate portion of the U-bend pipe. Similarly, the channel of the second clip member receiving therein a second of the elongate portions of the U-bend pipe to attach the second clip to the second elongate portion of the U-bend pipe.

As illustrated in FIG. 6 the elongate portions of the biasing member are is deflected to the deflected position to form the tremie space through which the tremie pipe is extended. The tremie pipe holds the biasing member in the deflected position to prevent the elongate portions of the biasing member from returning to the relaxed position.

Typically, as illustrated in FIG. 8, U-bend clamps are attached to the U-bend pipe and the tremie pipe at intervals along the length of the pipe as the U-bend pipe and tremie pipe are inserted into the bore in the ground surface. Grout may then be pumped into the bore through the tremie pipe to fill the bore with the grout. As the bore is filled with grout, the tremie pipe is pulled upwards and out of the tremie space. It has been discovered that the grout provides sufficient lubrication to permit sliding of tremie pipe tube out of the tremie space.

When the tremie pipe is removed from the respective tremie space, the elongate portions are biased to return to the relaxed position and force the elongate portions of the U-bend pipe away from each other and towards opposite regions of the inner surface of the bore to help maximize the space between the elongate portions of the U-bend pipe to help minimize the impairment of the heat transfer abilities of the elongate portions by one to the other.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A U-bend pipe spacer mounting to a pair of elongate portions of a U-bend pipe and an elongate tremie pipe of a geothermal vertical heat exchanger system, said U-bend pipe spacer comprising:

a biasing member comprising a pair of elongate portions each having a free end, said free ends of said elongate portions of said biasing member being biased apart from one another;

said elongate portions of said biasing member being resiliently deflectable from a relaxed position to a deflected portion such that said free ends of said elongate portions of said biasing member are positioned closer to each other when said elongate portions are in said deflected position;

a pair of clip members, each said clip member comprising:

a body having a concave arcuate side face defining a channel;

a tremie hook being coupled to said body;

said tremie hook having a concave side;

said body of a first of said clip members being coupled to said free end of a first of said elongate portions of said biasing member and said body of a second of said clip members being coupled to said free end of a second of said elongate portions of said biasing member;

said channels of said clip members facing outwardly away from each other;

said channel of said body of said first clip member being adapted for receiving a first elongate portion of a U-bend pipe therein, said channel of said body of said second clip member being adapted for receiving a second elongate portion of the U-bend pipe therein;

said bodies of said clip members being positioned adjacent each other when said elongate portions of said biasing member are positioned in said deflected position; and said tremie hooks of said clip members overlapping each other when said elongate portions of said biasing member are positioned in said deflected position such that said concave sides of said tremie hooks face one another and define a tremie space therebetween for extending a tremie pipe therethrough to hold said elongate portions of said biasing member in said deflected position such that said clip members are positioned adjacent each other.

2. The U-bend pipe spacer of claim 1, wherein said biasing member further comprises a coiled portion connecting said elongate portions of said biasing member together, said coiled portion of said biasing member permitting resilient deflection of said elongate portions of said biasing member with respect to one another.

3. The U-bend pipe spacer of claim 1, wherein said free end of each elongate portion of said biasing member has an elongate end extent outwardly extending therefrom, wherein said body of said first clip member is pivotally coupled to said end extent of said free end of said first elongate portion of said biasing member, and wherein said body of said second clip member is pivotally coupled to said end extent of said free end of said second elongate portion of said biasing member.

4. The U-bend pipe spacer of claim 3, wherein said bodies of said clip members each have a hole therein through which said end extent of the associated elongate portion of said biasing member to pivotally coupled said bodies of said clip members to said end extents of said elongate portions of said biasing member.

5. A U-bend pipe spacer system for use in the installation of a geothermal vertical heat exchanger system, comprising:
at least one U-bend pipe spacer, each said U-bend pipe spacer comprising:
a biasing member comprising a pair of elongate portions and a coiled portion connecting said elongate portions of said biasing member together;
said coiled portion of said biasing member permitting resilient deflection of said elongate portions of said biasing member with respect to one another;
each of said elongate portions of said biasing member having a free end opposite said coiled portion of said biasing member;
said free end of each elongate portion of said biasing member having an elongate end extent outwardly extending therefrom substantially perpendicular to the respective elongate portion of said biasing member;
said coiled portion of said biasing member permitting resilient deflection of said elongate portions of said biasing member towards each other from a relaxed position to a deflected portion such that said free ends of said elongate portions of said biasing member are positioned closer to each other when said elongate portions are in said deflected position;
each said U-bend pipe spacer further comprising a pair of clip members, each said clip member comprising:
a body having a pair of opposite end faces, a concave arcuate side face and three planar side faces extending between said end faces of said body;
said arcuate side face of said body having a generally C-shaped transverse cross section and defining a channel extending between said end faces of said body;
a first of said planar side faces of said body having tremie hook coupled thereto;
said tremie hook lying in a plane between said end faces of said body;
said tremie hook having proximal and distal portions extending substantially perpendicular to each other;
said proximal portion of said tremie hook being extended substantially parallel to said first planar side face;
said proximal portion of said tremie hook being outwardly extended in a direction away from a second of said planar side faces located adjacent said first planar side face;
said distal portion of said tremie hook being outwardly extended away from said first planar side face substantially perpendicular to said first planar side face;
said tremie hook having a concave side extending along said proximal and distal portions of said tremie hook;
said first planar side face of said body of a first of said clip members being pivotally coupled to said end extent of said free end of a first of said elongate portions of said biasing member;
said first planar side faces of said body of a second of said clip members being pivotally coupled to said end extent of said free end of a second of said elongate portions of said biasing member;
wherein said first planar side faces of said bodies of said clip members each have a hole therein through which said end extent of the associated elongate portion of said biasing member to pivotally coupled said first sides of said bodies of said clip members to said end extents of said elongate portions of said biasing member;
said second planar side faces of said bodies of said clip members facing one another;
said proximal portions of said tremie hooks of said clip members being extended towards each other;
said distal portions of said tremie hooks of said clip members being extended substantially parallel to each other in an opposite direction away from said end extents of said elongate portions of said biasing member;
said tremie hooks of said clip members overlapping each other when said elongate portions of said biasing member are positioned in said deflected position such that said concave sides of said tremie hooks face one another and define a tremie space therebetween;
a geothermal vertical heat exchanger system comprising;
a ground surface having an elongate vertical bore downwardly extending therein;
an elongate U-bend pipe having a pair of elongate portions and a U-bend connecting lower ends of said elongate portions of said U-bend pipe together;
an elongate tremie pipe having an open lower end and an upper end in fluid communication with a fluid bentonite grout mixture for pouring into the bore to fill the bore with the bentonite grout;
said channel of said first clip member receiving therein a first of said elongate portions of said U-bend pipe to attach said first clip to said first elongate portion of said U-bend pipe,
said channel of said second clip member receiving therein a second of said elongate portions of said U-bend pipe to attach said second clip to said second elongate portion of said U-bend pipe;
said elongate portions being deflected to said deflected position to form said tremie space, said tremie pipe being extended through said tremie space, said tremie pipe holding said biasing member in said deflected position to prevent said elongate portions of said biasing member from returning to said relaxed position; and
said U-bend pipe, said tremie pipe and said at least one U-bend pipe spacer being inserted into said bore in said ground.

* * * * *